United States Patent
Tabellion

(10) Patent No.: US 9,508,191 B2
(45) Date of Patent: Nov. 29, 2016

(54) OPTIMAL POINT DENSITY USING CAMERA PROXIMITY FOR POINT-BASED GLOBAL ILLUMINATION

(75) Inventor: Eric Tabellion, Belmont, CA (US)

(73) Assignee: Pacific Data Images LLC, Redwood City, CA (US)

( * ) Notice: Subject to any disclaimer, the term of this patent is extended or adjusted under 35 U.S.C. 154(b) by 1654 days.

(21) Appl. No.: 12/842,986

(22) Filed: Jul. 23, 2010

(65) Prior Publication Data

US 2012/0019533 A1   Jan. 26, 2012

(51) Int. Cl.
  *G06T 15/50* (2011.01)

(52) U.S. Cl.
  CPC .................. *G06T 15/506* (2013.01)

(58) Field of Classification Search
  None
  See application file for complete search history.

(56) References Cited

U.S. PATENT DOCUMENTS

| | | | |
|---|---|---|---|
| 6,489,955 B1 * | 12/2002 | Newhall, Jr. | 345/419 |
| 2006/0066616 A1 | 3/2006 | Sevastianov et al. | |
| 2008/0143720 A1 | 6/2008 | Elmquist | |
| 2009/0102834 A1* | 4/2009 | Tomite et al. | 345/419 |
| 2009/0322750 A1 | 12/2009 | Boulton | |

FOREIGN PATENT DOCUMENTS

| | | |
|---|---|---|
| KR | 10-2008-0045392 A | 5/2008 |
| WO | 2009/078561 A1 | 6/2009 |

OTHER PUBLICATIONS

Cortes et al., The RenderMan Shading Language Guide, 2008, Thompson, pp. 525-565.*
Christensen, Point-Based Approximate Ambient Occlusion and Color Bleeding, Nov. 2005 (Rev. Jun. 2008), Pixar Animation Studios.*
Baking in RenderMan, Pixar, http://rendermansite.pixar.com/view/baking-in-renderman.*
Aqsis Renderer User Manual, Aqsis Team, http://rendermansite.pixar.com/view/baking-in-renderman.*
Forsyth, Computer Vision: A Modern Approach, 2003, Pearson Education, Inc., pp. 55-68.*
Christensen, Point Clouds and Brick Maps for Movie Production, May 2007, Ch.8.4 in Point Based-Graphics, Morgan Kaufmann Publishers.*

(Continued)

*Primary Examiner* — Tize Ma
(74) *Attorney, Agent, or Firm* — Morrison & Foerster LLP

(57) ABSTRACT

A computer-animated scene is shaded using a point in a point cloud. The point represents a sample location on a surface primitive of an object in the scene. The surface primitive lies at least partially within a camera viewing frustum of a virtual camera, which has a focal point. A sample location distance, which is a near plane distance of the camera viewing frustum or the length of a line between the sample location on the surface primitive and the focal point of the virtual camera, is determined. A solid angle of the surface primitive subtended at the focal point of the virtual camera is obtained. A desired point area of the point in the point cloud is determined based on the sample location distance and the solid angle. The scene is shaded using the desired point area of the point in the point cloud.

37 Claims, 10 Drawing Sheets

(56) References Cited

OTHER PUBLICATIONS

"Point-Based Global Illumination", Retrieved on Aug. 27, 2010, Webpage available at: http://www.hradec.com/ebooks/CGI/RMS_1.0/rfm/Features_and_Effects/Global_Illumination.html#Point-Based.

Christensen, Per H., "Point-Based Approximate Ambient Occlusion and Color Bleeding", Pixar Animation Studios, Nov. 2005 (Revised Aug. 2006), 14 pages.

Christensen, Per H., "Point-Based Approximate Color Bleeding", Pixar Technical Memo #08-01, Pixar Animation Studios, Jul. 2008, 9 pages.

Cook et al., "The Reyes Image Rendering Architecture", ACM SIGGRAPH Computer Graphics, vol. 21, No. 4, Jul. 1987, pp. 95-102.

Goradia et al., "Visibility Map for Global Illumination in Point Clouds", Proceedings of the 5th International Conference on Computer Graphics and Interactive Techniques in Australia and Southeast Asia, 2007, pp. 39-46.

Krivanek et al., "Practical Global Illumination With Irradiance Caching", SIGGRAPH 2008 Class, Aug. 2008. pp. 1-405.

Mirtich, Brian, "V-Clip: Fast and Robust Polyhedral Collision Detection", ACM Transactions on Graphics, vol. 17, No. 3, Jul. 1998, pp. 177-208.

Ritschel et al., "Micro-Rendering for Scalable, Parallel Final Gathering", ACM Transactions on Graphics (Proceedings SIGGRAPH Asia 2009), vol. 28, No. 5, Dec. 2009, pp. 132:1-132:8.

Sainz et al., "Point-based rendering techniques", Computers & Graphics, vol. 28, 2004, pp. 869-879.

"Point-Based Approximate Ambient Occlusion and Color Bleeding" Pixar, RenderMan, available at https://renderman.pixar.com/resources/current/rps/pointBased.html, Nov. 2005 (Revised Jun. 2008), 19 pages.

"Attributes" Pixar, RenderMan, available at https://renderman.pixar.com/resources/current/rps/attributes.html, retrieved on Jul. 2, 2013, 27 pages.

\* cited by examiner

OPTIMAL POINT DENSITY USING CAMERA PROXIMITY FOR POINT-BASED GLOBAL ILLUMINATION

BACKGROUND

1. Field

This application relates generally to computer graphics, and more specifically to computer systems and processes for determining desired point area of a point used in point-based global illumination.

2. Related Art

Rendered images used in high-quality motion pictures need to be photorealistic. Global illumination is a technique used in computer graphics to add more realistic lighting to the scenes. Global illumination takes into account not only the light that comes directly from the light sources placed in the scene (direct illumination), but also light rays that are reflected by other surfaces in the scene (indirect illumination). For example, with direct illumination alone, shadows appear black, because there is no direct illumination in the shadowed areas. By contrast, global illumination allows light to bounce about in the scene before it is finally reflected towards the virtual camera. As a result, details in the shadowed areas may be seen as well.

Diffuse inter-reflection and caustics are two important components of global illumination. The simulation of diffuse inter-reflection includes simulating light reflecting off non-shiny surfaces such as the ground, walls, or fabric, to reach areas not directly in view of a light source. The simulation of a caustic includes the simulation of an envelope of light rays reflected or refracted by a curved surface or object.

Traditionally, global illumination is computed using a technique known as the Monte-Carlo ray tracing approach (also known as distributed ray tracing). (See Jaroslav Krivanek, Pascal Gautron, Greg Ward, Henrik Wann Jensen, Eric Tabellion, Per H. Christensen, "Practical global illumination with irradiance caching," *ACM SIGGRAPH* 2008 class, Los Angeles (August 2008).) Global illumination may also be computed using an approach known as the point-based global illumination (PBGI) approach. (See Per H. Christensen, "Point-based approximate color bleeding," *Pixar Technical Memo* #08-01 (July, 2008); hereinafter referred to as Christensen 2008.)

PBGI involves solving for the indirect illumination integrals and occlusion integrals. Before these integrals are solved, the directly illuminated geometry in the scene is represented by a point cloud representation, which is generated in a pre-computation phase prior to the rendering of the scene.

A point in a point cloud is a data representation of a surfel, which is a small circular disk-shaped surface element making up the different objects within a scene. As described in Christensen 2008, the surfaces of different objects are subdivided into small micropolygons, and the color reflected from each micropolygon is stored in a point. A point can also store other information, including a position, a surface normal, an effective area, a point-radius, and the like. As described in Christensen 2008, the effective area and the point-radius stored in a point are not the same thing; rather, they are two different representations of the size of the point. The point-radius circumscribes the micropolygon that the point represents. This ensures that the surfaces are completely covered by the points with no gaps in between. The effective area is the point's real area, which is smaller than the area corresponding to the point-radius.

To efficiently solve the illumination integrals with PBGI, the generated point cloud is further organized into a multi-resolution level-of-detail hierarchy. For example, an octree data structure may be used to partition the three dimensional space represented by a point cloud by recursively subdividing the space into eight octants. Leaf nodes in the octree store the individual points. Each node other than a leaf node is a point cluster, which is an approximation of a collection of points situated within a particular volume. For example, a point cluster representation includes an average position for the cluster, as well as the projected area and emitted power when the cluster is viewed from various directions (the directional projected area and directional emitted power, respectively).

After generating the octree hierarchy, both the full point cloud and the octree hierarchy may then be used to compute the indirect illumination integrals and occlusion integrals at all the "shading locations" seen from the virtual camera. However, not all the nodes of the octree are necessary for computing the integrals at a particular shading location. For example, when an object is far away, less refined nodes of the octree may be used for calculating the various integrals. When an object is close by, more refined nodes or even individual points may be used. However, using more refined nodes for computing the integrals translates to longer shading time.

A cut picking algorithm is an algorithm used to determine a subset of nodes of the octree for computing the integrals at a particular shading location. The algorithm takes as input a user-specified solid angle (i.e., a two-dimensional angle in three-dimensional space that an object subtends at a point of view), referred to as the "cut quality criterion solid angle". The algorithm compares this "cut quality criterion solid angle" with the point cluster solid angle to determine whether the point cluster (less refined) or its children (more refined) should be used. In particular, the point cluster solid angle is the subtended solid angle of the cluster when looked at from the point of view of the current shading location. If this point cluster solid angle is larger than the "cut quality criterion solid angle," the point cluster is removed from the cut and replaced by its child nodes in the octree. This cut picking algorithm iterates until all nodes on the cut satisfy the cut picking criterion. After the cut picking algorithm has been applied, the clusters and points on the cut may then be used as the appropriate geometric representations of the scene for solving the integrals.

It should be recognized that the "cut quality criterion solid angle" is measured in steradians, and its magnitude can be traded off for render time. The render time increases as the "cut quality criterion solid angle" becomes smaller. In general, a smaller cluster area may be needed for closer objects, whereas a larger cluster area may be acceptable for objects further away. Using a solid angle measured in steradians as the cut quality criterion will achieve this result.

The octree clustering technique described above reduces the complexity of solving the actual integrals significantly. Nevertheless, the amount of execution time required by the algorithm used to build the octree clustering and the amount of memory required to store the aforementioned data structures each has a complexity order of O(n), where n is the number of input points. Therefore, the point count has an impact on the overall performance of the pre-processing algorithm and on the memory requirement for PBGI. Reducing the number of points is thus advantageous. Furthermore, in order to handle the large point counts necessary to represent most scenes, some implementations rely on out-of-core pre-processing and accessing of data structures. As a result, the amount of Input/Output (I/O) performed may be reduced by reducing the number of points as well.

In some PBGI implementations, points are only generated inside the camera frustum and any objects outside the camera frustum are discarded. As a result, a user has to place an alternate distant virtual camera with a camera frustum encompassing the scene to include all the objects that are out-of-view from the main rendering camera, in order to account for occlusion or indirect illumination coming from these objects.

Placing an alternate distant virtual camera has two negative side-effects. First, the objects that are in-view with reference to the main rendering camera no longer receive a point density with point areas that are proportional to the pixels of the final rendered image, since an alternate camera is used to evaluate the required point area and density. This requires the user to manually adjust the desired point density, and achieves an unnecessarily high point density for objects that are in-view and far from the main rendering camera. The second problem is that objects that are out-of view with reference to the main rendering camera have an unnecessarily high point density when compared to the required fidelity imposed on distant objects by the cut-quality criterion of the cut picking algorithm described above.

SUMMARY

In one exemplary embodiment, a computer-animated scene is shaded using a point in a point cloud. The point represents a sample location on a surface primitive of an object in the scene. The surface primitive lies at least partially within a camera viewing frustum of a virtual camera, which has a focal point. A sample location distance, which is a near plane distance of the camera viewing frustum or the length of a line between the sample location on the surface primitive and the focal point of the virtual camera, is determined. A solid angle of the surface primitive subtended at the focal point of the virtual camera is obtained. A desired point area of the point in the point cloud is determined based on the sample location distance and the solid angle. The scene is shaded using the desired point area of the point in the point cloud.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1:
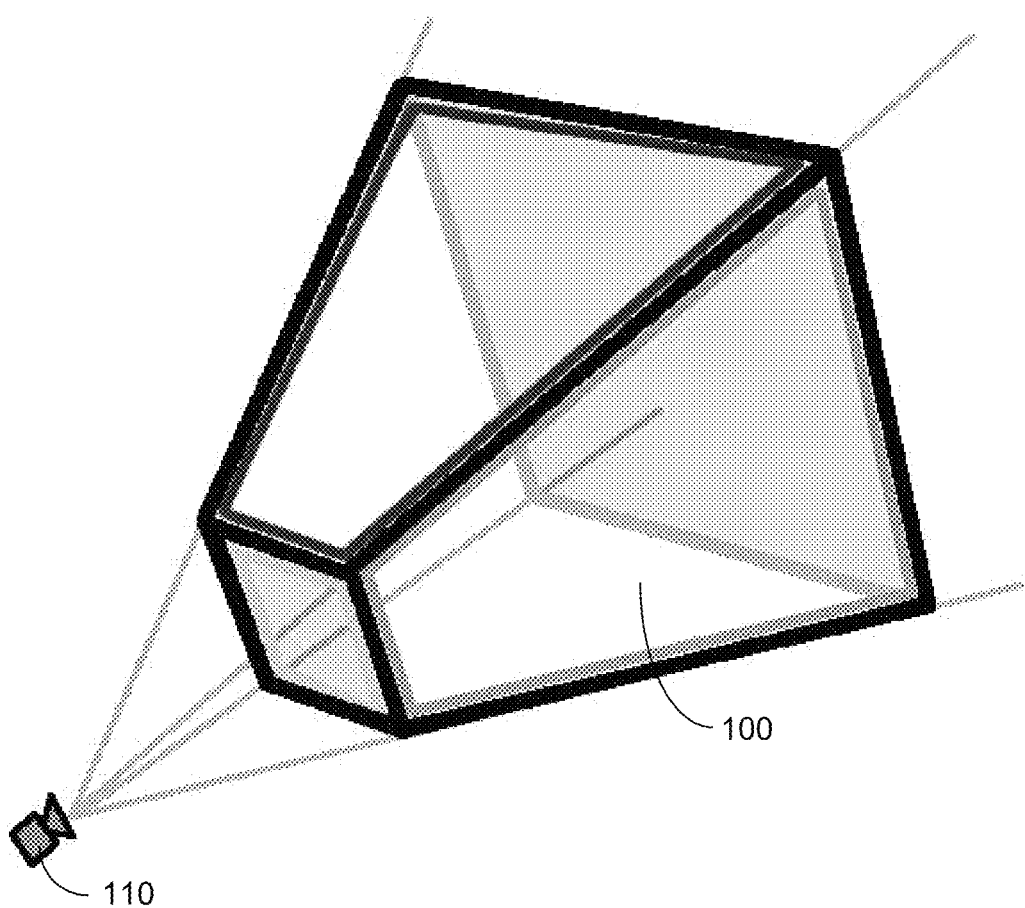
FIG. 1 illustrates an exemplary camera view frustum.

FIG. 1 illustrates a camera view frustum 100 that may be used in computer graphics. It is a geometric representation of the volume visible to a virtual camera 110. A camera frustum may have various shapes. The camera frustum 100 as shown in FIG. 1 is a rectangular pyramid with six clipping planes: near plane, far plane, top plane, bottom plane, left plane, and right plane.

Figure 2A:
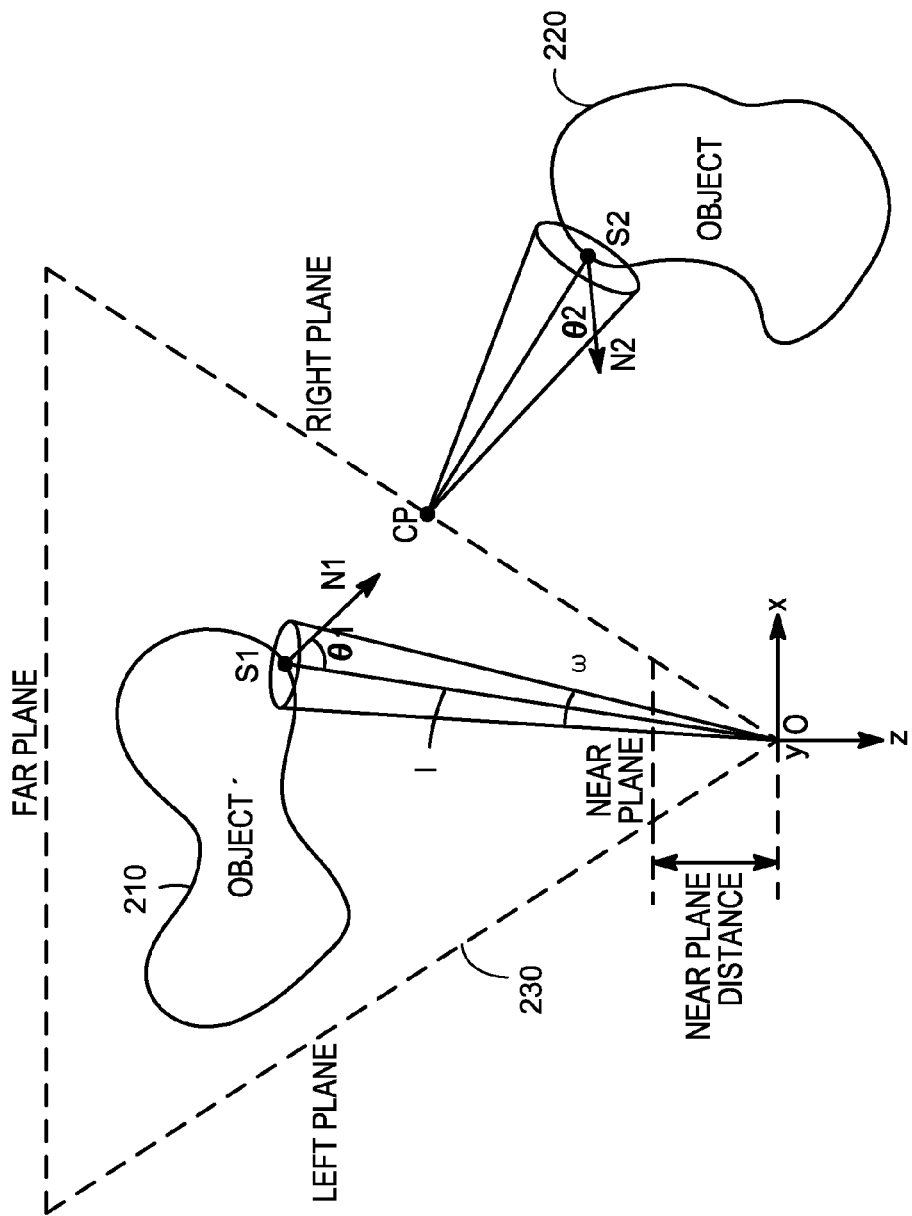
FIG. 2A illustrates an in-view object and an out-of-view object within a camera space.

An object in a scene lying within a viewing frustum is said to be in-view. Conversely, an object lying outside a viewing frustum is said to be out-of-view. For example, as shown in FIG. 2A, object 210 is in-view, while object 220 is out-of-view. Note that an object may also be partially in-view and partially out-of-view. Out-of-view objects are not directly visible in the rendered image; however, light may bounce off out-of view objects. Therefore, to render an image of a scene from a given camera view using PBGI, a point cloud representation of both the in-view and out-of-view objects is generated.

An object is typically represented by surface primitives, such as parametric surfaces. To generate a point cloud for an object, a desired point area is derived at different sample locations on each surface primitive of the object. Based on the set of determined point areas, a modified REYES tessellator "split and dice" algorithm is then used to tessellate the surface primitives into a grid of micropolygons, which may be further converted into points.

Figure 5:
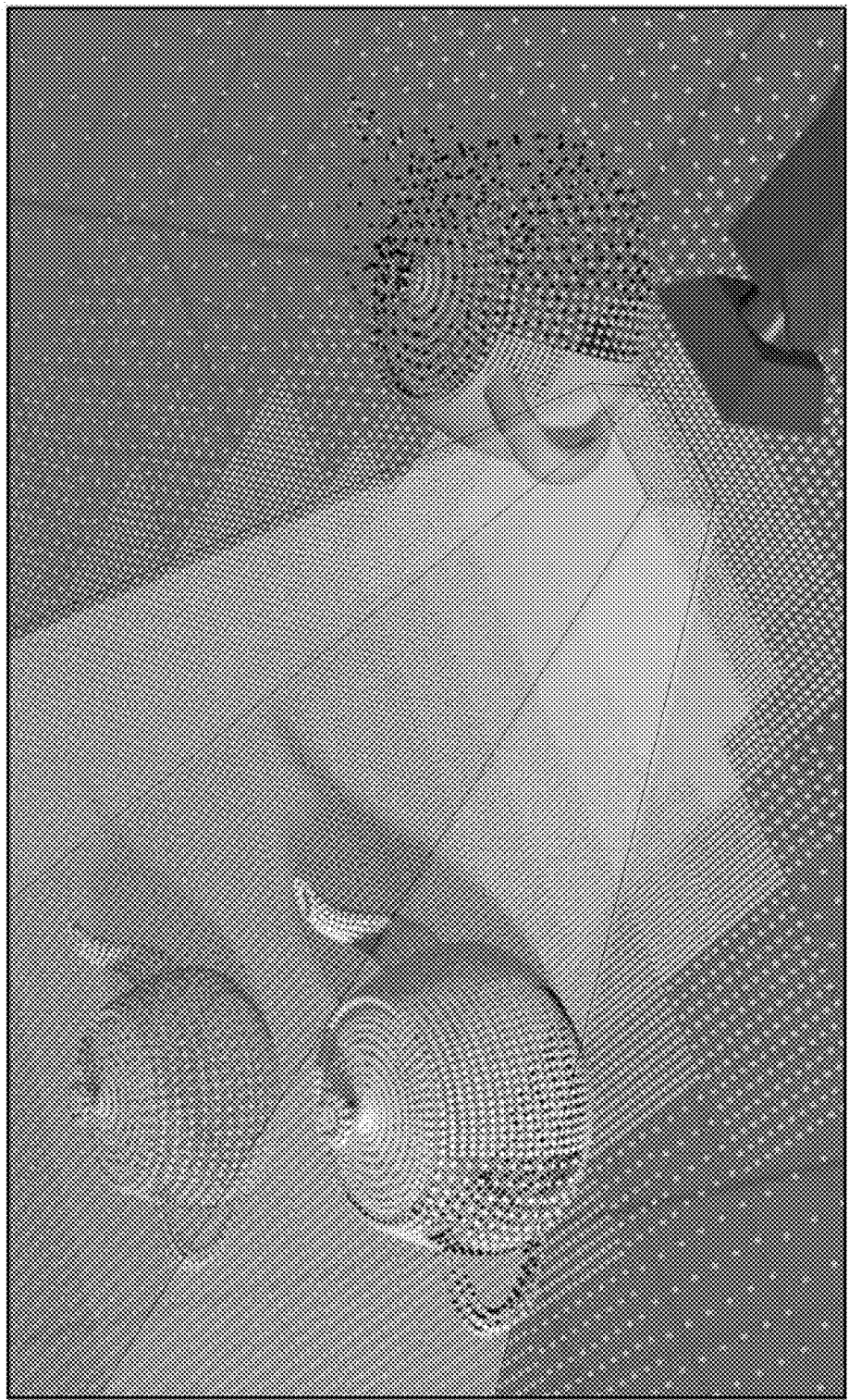
FIG. 5 illustrates the point density of in-view and out-of-view objects in an exemplary scene with a first camera location.
Figure 8:
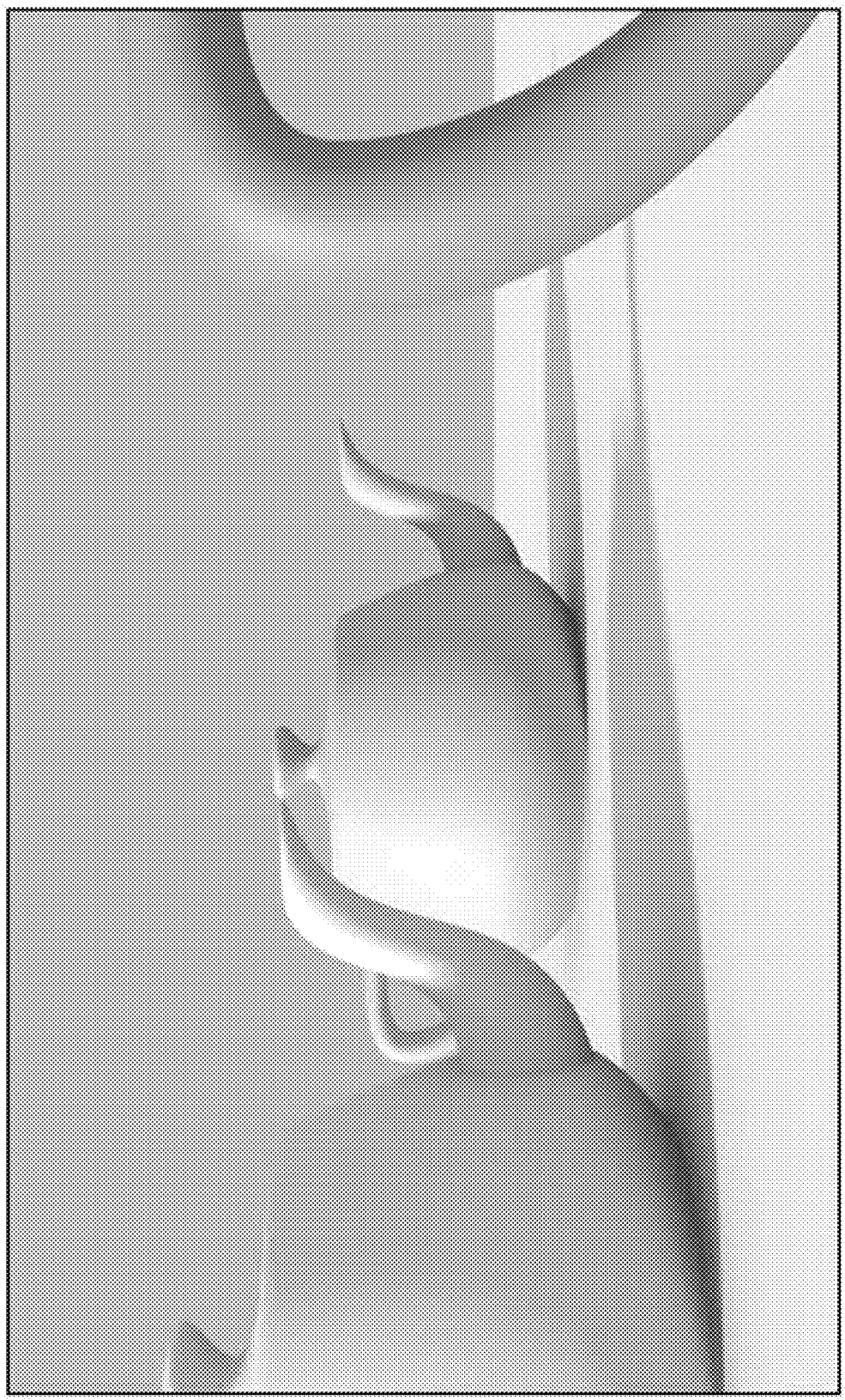
FIG. 8 illustrates a rendered image corresponding to the point density and camera location as shown in FIG. 5.

FIG. 5 illustrates the point density of both in-view and out-of-view objects in an exemplary scene. The point areas of the points of the point clouds shown in FIG. 5 are intentionally not shown in order to better illustrate the overall point density of the point cloud. FIG. 8 illustrates a rendered image that was rendered and shaded using the point density and camera location as shown in FIG. 5.

Figure 2B:
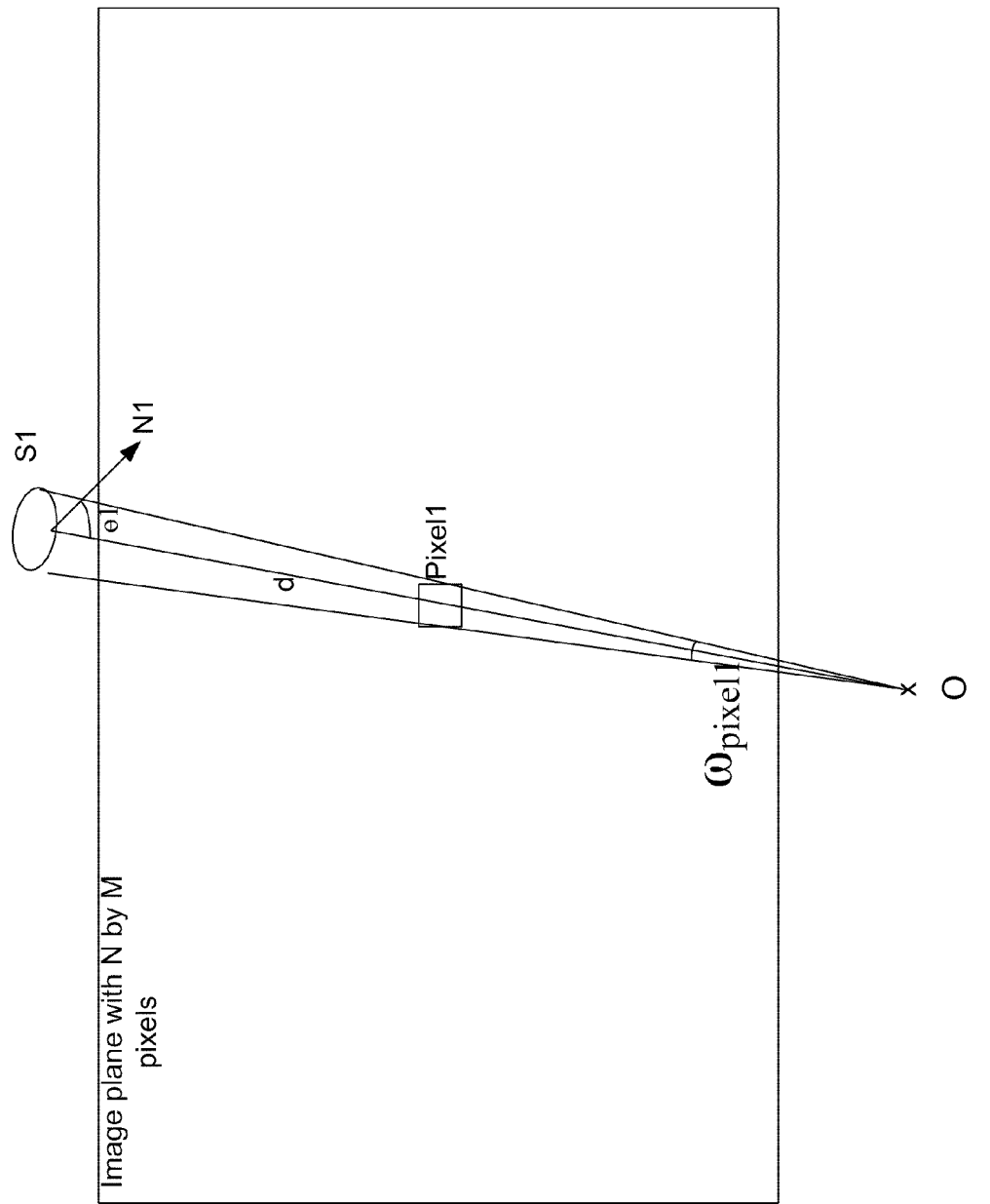
FIG. 2B illustrates the projection of a point through the camera projection onto the rendered image plane.

The desired point area and density should be selected to provide proper surface coverage of the object, but increasing the point density everywhere in the scene will unnecessarily increase the total number of points. Thus, as will be described in more detail below, in one exemplary embodiment, different desired point areas and densities of in-view objects and out-of-view objects can be used. For in-view objects, the desired point area and density can be selected such that once the points in the point cloud are projected through the camera projection onto the rendered image plane, the points are approximately pixel-sized and pixel-spaced as illustrated in FIG. 2B. These points may model indirect lighting and surface self-occlusion with pixel-sized surface detail. However, for out-of-view objects, a larger point area and lower point density may suffice.

Figure 3:
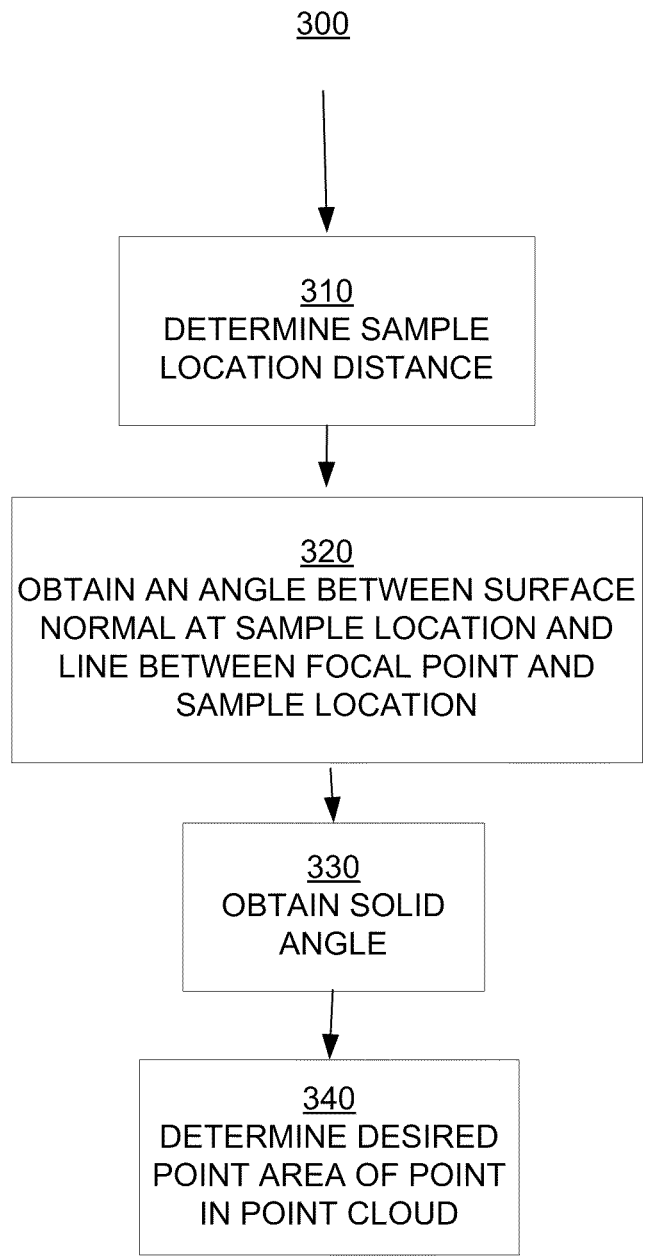
FIG. 3 illustrates an exemplary process for determining a desired point area of a point of a point cloud used for an in-view object in a scene.

FIG. 3 depicts an exemplary process 300 for determining a desired point area of a point in a point cloud that represents an object in the scene, which is to be shaded, where the point represents a location on a surface primitive of the object that is at least partially within the camera viewing frustum of the virtual camera. The calculations for determining the desired point area are done in camera space. As shown in FIG. 2A, camera space is a three-dimensional Cartesian coordinate system in which the origin O of the orthogonal coordinate axes (x, y, and z) is located at the focal point of the virtual camera (the single point of the virtual camera). In FIG. 2A, the x-axis points to the right and the y-axis points up. However, it should be recognized that the coordinate axes may have a different orientation.

In the present exemplary process, the calculations for determining the desired point area are done in camera space for a number of reasons. Working in projected space (a coordinate system with the origin lying on the rendered image plane), as opposed to camera space, has shortcomings when points of a point cloud for out-of-view objects are generated. For example, working in projected space causes "point holes" on surfaces at grazing angles (i.e., when the surface is almost parallel to the line of sight). These "point holes" produce gaps, which may cause undesirable light or occlusion leaks.

Also, working in projected space often requires perspective projections, which include perspective divide operations. Because a perspective divide operation involves a division by a distance from the camera focal point, if a surface primitive of an out-of-view object lies on the camera focal plane, the distance has a value close to zero, and the perspective divide operation would cause numerical issues. Doing calculations in camera space avoids the above difficulties.

With reference to FIG. 3, in step 310 of process 300, a sample location distance, which is the length of a line between the sample location on the surface primitive on the object to the focal point of the virtual camera, is determined. For example, with reference to FIG. 2A, to determine the desired point area of points for a sample location on a surface primitive S1 of an object lying within the camera viewing frustum 230, a sample location distance d is determined as:

$$d = \text{the length of a line } I \text{ between surface primitive } S1 \text{ and origin } O. \quad (1)$$

In FIG. 2, origin O corresponds to the focal point of the virtual camera. Thus, in this example, line I is between the sample location at the center of surface primitive S1 and the focal point of the camera.

With reference again to FIG. 3, in step 320, an angle between the surface normal at the sample location and the line between the focal point of the virtual camera and the sample location is determined. For example, with reference to FIG. 2A, an angle θ1 is determined as:

$$\theta1 = \text{the angle between the surface normal } N1 \text{ of } S1 \text{ and line } I, \quad (2)$$

where N1 is the surface normal at the sample location on surface primitive S1.

With reference again to FIG. 3, in step 330, a solid angle of the surface primitive subtended at the focal point of the virtual camera is obtained. For example, FIG. 2A shows solid angle ω of surface primitive S1 subtended at origin O, which corresponds to the focal point of the virtual camera. In particular, FIG. 2B depicts the solid angle $\omega_{pixel1}$ of a particular pixel (pixel1) in the rendered image plane.

With reference again to FIG. 3, in step 340, the desired point area of the point in the point cloud is determined based on the sample location distance (determined in step 310), the angle (determined in step 320), and the solid angle (obtained in step 330). In particular, with reference to FIG. 2A, the desired point area of the point in the point cloud can be determined as:

$$(\text{desired point area}) = \omega*(d*d)/\cos(\theta1). \quad (3)$$

As described earlier, for in-view objects, it is desirable to generate points such that once the points are projected through the camera projection onto the rendered image plane, the points are approximately pixel-sized and pixel-spaced as shown in FIG. 2B. Because the solid angle of each of the pixels of a rendered image plane is almost the same, an approximation may be made in some exemplary embodiments that the solid angle ω of any pixel is equal to the solid angle of the center pixel, i.e., the pixel closest to the center of the rendered image plane. In these exemplary embodiments, the solid angle ω in equation (3) can be set equal to $\omega_{center\ pixel}$ (the solid angle of the center pixel), and stored as a predetermined constant. Thus, in these exemplary embodiments, the solid angle ω obtained in step 330 (FIG. 3) is the stored predetermined constant (e.g., $\omega_{center\ pixel}$).

In some exemplary embodiments, the solid angle of a pixel at a corner of the rendered image plane may be used to approximate ω instead. Since the center pixel has the largest solid angle among all the pixels in the rendered image plane, using the center pixel solid angle results in the largest desired point area. Conversely, using the solid angle of other pixels in the rendered image plane results in a smaller desired point area and a higher point density. However, the two should not differ significantly except for very wide-angle perspective projections. In practice, using points having a projected area on the rendered image plane equaling one and a half times the area of a pixel reduces the point count by half, while maintaining enough detail and avoiding self-occlusion artifacts.

In some exemplary embodiments, equation (3) may be used to determine a desired point area of points in a point cloud for an object that straddles across the near plane. Accordingly, sample location distance d may fall below the near plane distance (i.e., the distance between the near plane and the origin O of the camera space) for some surface primitives of the object. In order to avoid the desired point area from becoming too small (or the point density from becoming too high), the lower limit of d may be set to the near plane distance:

$$d = \text{MAX}(\text{the length of line } I, \text{ the near plane distance}), \quad (4)$$

where MAX( ) is the maximum function. Thus, in these exemplary embodiments, the sample location distance d determined in step 310 (FIG. 3) is the maximum of the length of line I or the near plane distance.

In some exemplary embodiments, to avoid an infinite desired point area and a correspondingly infinitesimal point density at grazing angles (i.e., when angle θ1 nears ninety degrees), the cosine of angle θ1 is approximated as 1. Thus, in these exemplary embodiments, when angle θ1 is within a predetermined value near ninety degrees, in step 340 (FIG. 3), the desired point area can be determined based on the sample location distance (determined in step 310) and the solid angle (obtained in step 330). For example, equation (3) may be rewritten without reference to the surface orientation by ignoring the cosine term in equation (3):

$$(\text{desired point area}) = \omega*(d*d). \quad (5)$$

To render and shade the scene using the desired point area determined above, the REYES tessellator "split and dice" algorithm can be modified to work with surfaces in camera space. In particular, using the exemplary process described above, the desired point area is derived at different sample locations on a surface primitive (e.g., a parametric surface) of an object. If the minimum desired point area and the maximum desired point area on a surface primitive differ by too much, the primitive is split into smaller ones before dicing may be done. For example, in one exemplary embodiment, when the minimum desired point area is less than 75 percentage of the maximum desired point area, the primitive is split into smaller ones.

Dicing is the step of tessellating the primitive into a grid of micropolygons, which may be further converted into points. First, the size of the primitive (defined by (u, v) parametric coordinates) is estimated along the u and v directions. Assuming that the desired point area is a rectangle (u'×v'), the dice rate along the u direction, then, is the size of the primitive along the u direction divided by u'. Similarly, the dice rate along the v direction is the size of the primitive along the v direction divided by v'.

It should be recognized that the actual point areas of the points obtained from the adaptive split and dice steps described above may be different for each point and are distributed around the desired point area. It should also be recognized that the adaptive split and dice steps described above are performed in camera space. Traditional tesselators, by contrast, operate in projected space.

Figure 4:
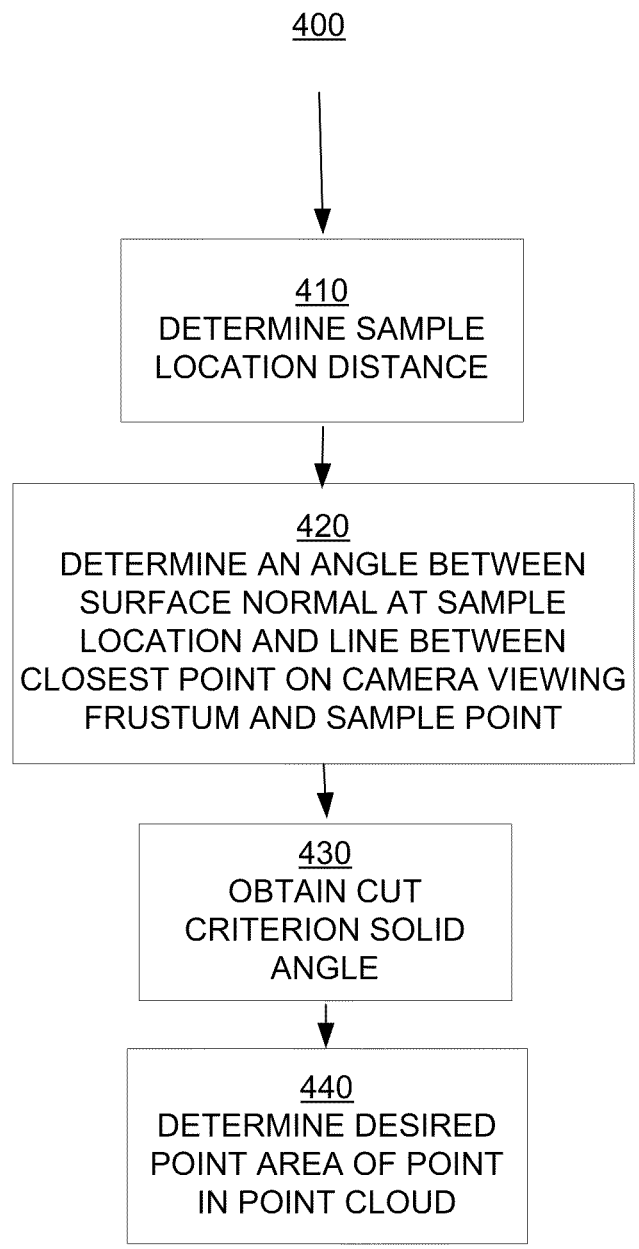
FIG. 4 illustrates an exemplary process for determining a desired point area of a point of a point cloud used for an out-of-view object in a scene.

FIG. 4 depicts an exemplary process 400 for determining a desired point area of a point in a point cloud that represents an object, where the point represents a location on a surface primitive of the object that is at least partially outside the camera viewing frustum of the virtual camera. The calculations for determining the desired point area are done in camera space.

In step 410 of process 400, a sample location distance, which is the distance of a line between the sample location on the surface primitive on the object and the closest point on the camera viewing frustum, is determined. For example, with reference to FIG. 2A, to determine the desired point area of points for a sample location on a surface primitive S2 lying outside the camera viewing frustum 230, a sample location distance d' is determined as:

$$d'=\text{the length of a line } l' \text{ between surface primitive } S2 \text{ and } CP, \quad (6)$$

where CP is the closest point to S2 on the camera frustum 230 (a point is on the camera frustum if it lies on any of the clipping planes of the camera frustum).

The CP on the camera frustum may be computed efficiently for many successive surface primitives that are spatially coherent, using an amortized constant-time algorithm that applies to an arbitrary convex polyhedron. (See Brian Mirtich, "V-Clip: fast and robust polyhedral collision detection," *ACM TRANSACTIONS ON GRAPHICS (TOG)*, v. 17 n. 3, p. 177-208 (July 1998); hereinafter referred to as Mirtich 1998.) For example, the algorithm may be used to compute the CP on an orthographic or perspective camera frustum that bounds the viewing volume by six clipping planes: near plane, far plane, top plane, bottom plane, left plane, and right plane.

With reference again to FIG. 4, in step 420, an angle between the surface normal at the sample location and the line between the CP on the camera viewing frustum and the sample location is determined. For example, with reference to FIG. 2A, an angle θ2 is determined as:

$$\theta 2 = \text{the angle between the surface normal } N2 \text{ of } S2 \text{ and line } l'. \quad (7)$$

With reference again to FIG. 4, in step 430, a cut quality criterion solid angle $\omega_{cut}$ is obtained. As described above, the cut quality criterion solid angle is used to select a subset of nodes of an octree for shading, where the octree is a data structure corresponding to the point cloud.

In step 440, the desired point area of the point in the point cloud is determined based on the sample location distance (determined in step 410), the angle (determined in step 420), and the cut quality criterion solid angle $\omega_{cut}$ (determined in step 430). In particular, with reference to FIG. 2A, the desired point area of the point in the point cloud can be determined as:

$$\text{(desired point area)} = \omega_{cut} * (d'*d')/\cos(\theta 2). \quad (8)$$

In some exemplary embodiments, to avoid an infinite desired point area and a correspondingly infinitesimal point density at grazing angles (i.e., when angle θ2 nears ninety degrees), the cosine of angle θ2 is approximated as 1. Thus, in these exemplary embodiments, when angle θ2 is within a predetermined value near ninety degrees, in step 440 (FIG. 4), the desired point area can be determined based on the sample location distance (determined in step 410) and the cut quality criterion solid angle (obtained in step 430). For example, equation (8) may be rewritten without reference to the surface orientation, by ignoring the cosine term in equation (8):

$$\text{(desired point area)} = \omega_{cut} * (d'*d'). \quad (9)$$

As S2 gets closer to the camera frustum 230, the sample location distances d' in equations (8) and (9) become small. As a result, the point density becomes higher than a point density calculated for the in-view case. To achieve a smoother transition in point density as S2 moves out and away from the camera frustum 230, the desired point area may be determined using both the in-view process 300 (FIG. 3) and the out-of-view process 400 (FIG. 4), and the larger point area of the two may be selected.

To render and shade the scene using the desired point area determined above, the REYES tessellator "split and dice" algorithm can be modified to work with surfaces in camera space. The adaptive split and dice steps for surfaces lying outside the camera view frustum are similar to those described for surfaces lying within the camera view frustum.

It should be recognized that process 400 (FIG. 4) provides a metric for deriving an optimal point density to represent objects that are out-of-view, with the required fidelity imposed on distant objects by the "cut quality criterion" of the cut picking algorithm. For objects out-of-view, process 400 (FIG. 4) is optimal in the respect that it generates points that are no smaller than the size of a valid cluster that satisfies the "cut quality criterion" in order to illuminate any point inside the camera view frustum. This metric satisfies the overall indirect illumination quality requirements and therefore does not introduce any more undesirable artifacts than the PBGI cut picking algorithm itself.

To account for both in-view and out-of view objects, both processes 300 (FIG. 3) and 400 (FIG. 4) can be performed. It should be recognized that these processes can be performed in either order. For example, process 300 (FIG. 3) can be performed first to account for in-view objects, and then process 400 (FIG. 4) can be performed to account for out-of-view objects. Alternatively, process 400 (FIG. 4) can be performed first to account for out-of-view objects, and then process 300 (FIG. 3) can be performed to account for in-view objects.

The exemplary processes described above can produce at least one point per surface primitive with an area at least equal to the surface area. In some exemplary embodiments, fewer points than surface primitives may be desired. For example, for small surface primitives that are far away from the virtual camera, some of the points may be randomly removed. The probability p of removing a point may be set to:

$$p=\text{effective point area/desired point area}. \tag{10}$$

It is contemplated that the probability of removing a point may be set to other ratios. Those of ordinary skill in the art will recognize that other similar implementations are possible.

It should be recognized that in some exemplary embodiments, the tessellated surfaces need not to be watertight, i.e., the tessellated surfaces may have gaps in between. Accordingly, tessellation operations related to surface stitching may be disabled during tessellation. This may avoid unnecessary tessellation constraints required to enforce stitching, and thus reduce the point count even further.

It should also be recognized that the exemplary processes described above may be used to generate points for rendering stereoscopic images. A stereoscopic imaging system creates the illusion of depth in a rendered image by presenting a slightly different image to each eye. The two slightly different images are called a stereo pair. As described above and depicted in FIG. 2A, the closest point to S2 on the camera frustum (CP in equation (6)) may be computed efficiently for a camera frustum that is a convex polyhedron. To render stereoscopic images, the desired point area and density are determined separately for each eye, since the camera frustum of a stereoscopic camera may be non-convex (due to stereo convergence). The smaller desired point area and correspondingly larger point density computed for the two eyes are then selected.

Similarly, if the virtual camera or an object is moving at high speed, the desired point area and density may be determined at different time samples. The smaller desired point area and correspondingly larger point density computed at the different time samples are then selected.

Figure 6:
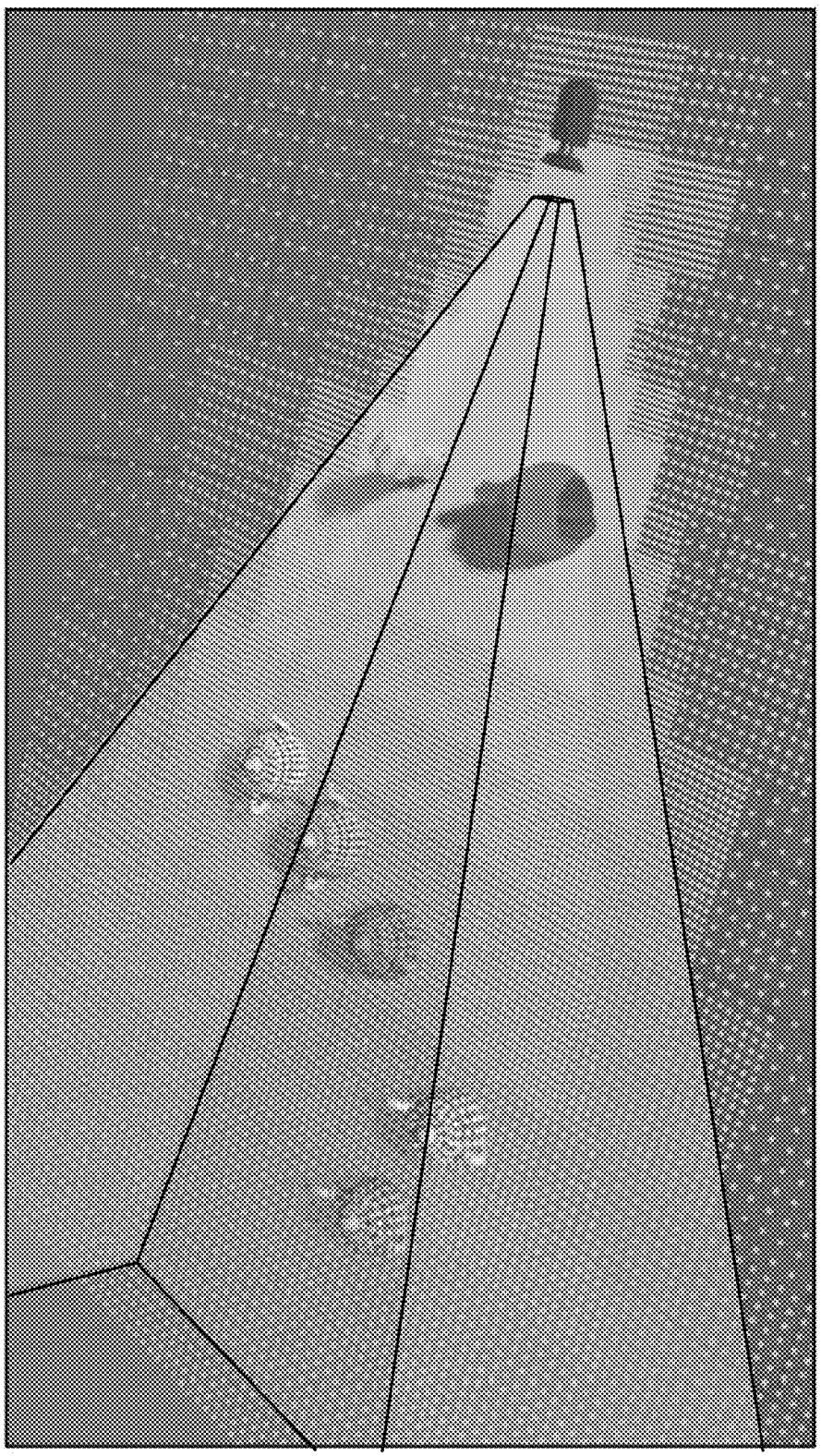
FIG. 6 illustrates the point density of in-view and out-of-view objects in an exemplary scene with a second camera location.
Figure 7:
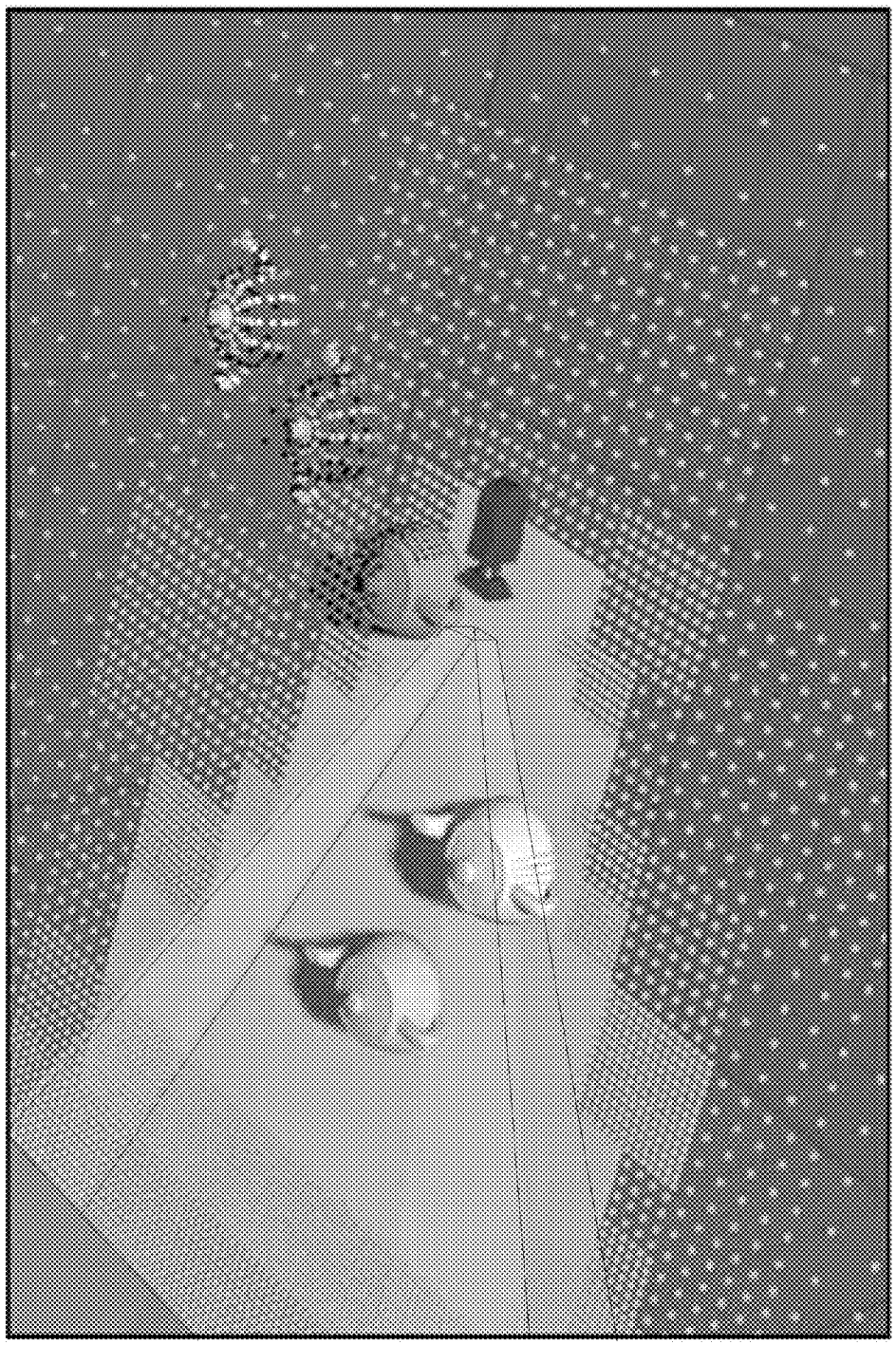
FIG. 7 illustrates the point density of in-view and out-of-view objects in an exemplary scene with a third camera location.

FIGS. 5-7 each illustrates the point density of in-view and out-of-view objects in an exemplary scene for different camera locations. The point density decays with the distance from the camera frustum. In FIGS. 5-7, the size of the points is intentionally not shown in order to better illustrate the overall point density of the scene. However, computer simulation results have shown that surface patches that are in-view are tessellated into approximately pixel-sized points. Surface patches that are out-of-view are tessellated with fewer and larger points as the distance of the surface patches from the camera frustum increases. The rate of decay of the point density is proportional to the cut quality criterion. As a result, the number of points generated for out-of-view objects is significantly reduced without introducing undesirable artifacts or flickering to the animation. FIG. 8 illustrates a rendered image corresponding to the point density and camera location as shown in FIG. 5. The image is rendered with un-textured PBGI and includes direct key lighting coming from the left, one-bounce diffuse inter-reflections, and diffuse environment map lighting.

Figure 9:
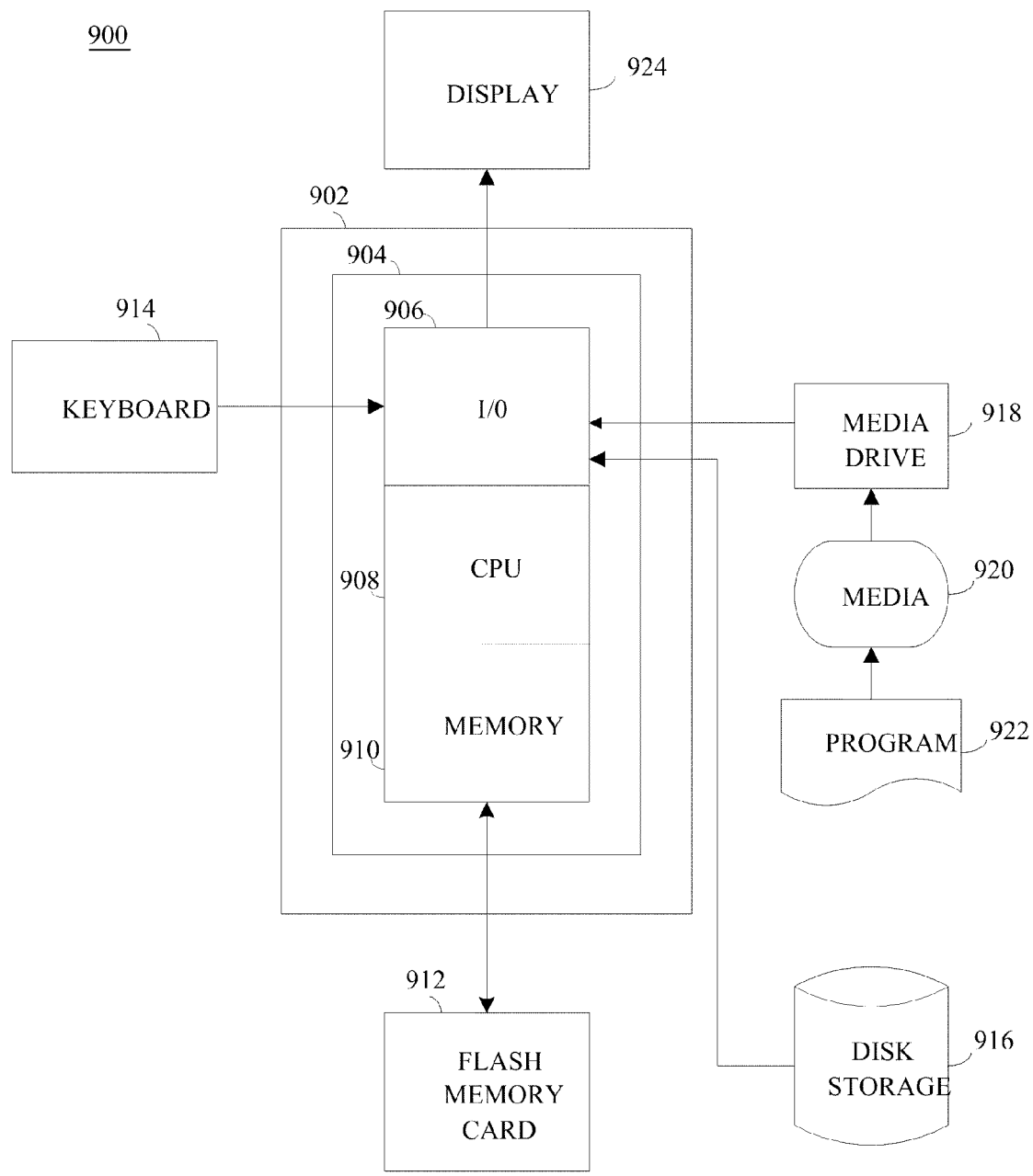
FIG. 9 illustrates an exemplary computing system.

FIG. 9 depicts an exemplary computing system 900 configured to perform any one of the above-described processes. In this context, computing system 900 may include, for example, a processor, memory, storage, and input/output devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform the above-described processes. The main system 902 includes a motherboard 904 having an input/output ("I/O") section 906, one or more central processing units ("CPU") 908, and a memory section 910, which may have a flash memory card 912 related to it. The I/O section 906 is connected to a display 924, a keyboard 914, a disk storage unit 916, and a media drive unit 918. The media drive unit 918 can read/write a computer-readable medium 920, which can contain programs 922 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-enabled method of shading a scene using a point in a point cloud, the point representing a sample location on a surface primitive of an object in the scene, the surface primitive lying at least partially within a camera viewing frustum of a virtual camera, the virtual camera having a focal point, the method comprising:
   determining a sample location distance, wherein the sample location distance is a near plane distance of the camera viewing frustum or the length of a line between the sample location on the surface primitive and the focal point of the virtual camera;
   obtaining a solid angle of the surface primitive subtended at the focal point of the virtual camera;
   determining a first desired point area of the point in the point cloud based on the sample location distance and the solid angle; and
   shading the scene using the first desired point area of the point in the point cloud.

2. The method of claim 1, further comprising:
   determining an angle between a surface normal at the sample location and the line between the sample location and the focal point of the virtual camera.

3. The method of claim 2, wherein the first desired point area is determined based on the sample location distance, the solid angle, and the angle between the surface normal at the sample location and the line between the sample location and the focal point of the virtual camera.

4. The method of claim 3, wherein the first desired point area is determined by multiplying the solid angle by the square of the sample location distance and dividing by the cosine of the angle between the surface normal at the sample location and the line between the sample location and the focal point of the virtual camera.

5. The method of claim 3, wherein, when the angle is determined to be within a predetermined value near ninety degrees, the first desired point area is determined by multiplying the solid angle by the square of the sample location distance.

6. The method of claim 1, wherein the obtained solid angle is a solid angle of a center pixel of a rendered image plane.

7. The method of claim 1, wherein determining the sample location distance comprises:
    determining the sample location distance in a camera space, the camera space being a three-dimensional Cartesian coordinate system in which the origin of the coordinate axes is located at the focal point of the virtual camera.

8. The method of claim 1, wherein determining the sample location distance further comprising:
    selecting the maximum of either the near plane distance or the length of the line.

9. The method of claim 1, wherein the virtual camera is located at a first virtual camera location corresponding to a first image of a stereo pair.

10. The method of claim 9, further comprising:
    determining a second desired point area for a second virtual camera location corresponding to a second image of the stereo pair; and
    selecting the smaller of the first desired point area or the second desired point area.

11. The method of claim 1, wherein shading the scene includes:
    tessellating a plurality of surface primitives of the object into a plurality of micropolygons based on the first desired point area; and
    converting the plurality of micropolygons into a plurality of points.

12. The method of claim 11, further comprising:
    removing a portion of the plurality of points based on an effective point area of the plurality of points and the first desired point area.

13. A computer-enabled method of shading a scene using a point in a point-cloud, the point representing a sample location on a first surface primitive of a first object, the first surface primitive lying at least partially outside a camera viewing frustum of a virtual camera, the virtual camera having a focal point, the method comprising:
    determining a first sample location distance, wherein the first sample location distance is the length of a first line between the first sample location on the first surface primitive and a closest point on the camera viewing frustum;
    obtaining a cut quality criterion solid angle, wherein the cut quality criterion solid angle is used to select a subset of nodes of an octree for shading, and wherein the octree is a data structure corresponding to the point cloud;
    determining a first desired point area of the point in the point cloud based on the first sample location distance and the cut quality criterion solid angle; and
    shading the scene using the first desired point area of the point in the point cloud.

14. The method of claim 13, further comprising:
    determining a first angle between a surface normal at the first sample location and the first line.

15. The method of claim 14, wherein the first desired point area is determined based on the first sample location distance, the cut quality criterion solid angle, and the first angle.

16. The method of claim 15, wherein the first desired point area is determined by multiplying the cut quality criterion solid angle by the square of the first sample location distance and dividing by the cosine of the first angle.

17. The method of claim 14, wherein, when the first angle is determined to be within a predetermined value near ninety degrees, the first desired point area is determined by multiplying the cut quality criterion solid angle by the square of the first sample location distance.

18. The method of claim 13, further comprising:
    determining a second sample location distance, wherein the second sample location distance is a near plane distance of the camera viewing frustum or the length of a second line between a second sample location on a second surface primitive and the focal point of the virtual camera, wherein the second surface primitive is of a second object, and wherein the second surface primitive is at least partially within the camera viewing frustum;
    obtaining a solid angle of the second surface primitive subtended at the focal point of the virtual camera;
    determining a second desired point area of another point based on the second sample location distance and the solid angle; and
    shading the scene using the second desired point area.

19. The method of claim 18, further comprising:
    determining a second angle between a surface normal at the second sample location and the second line.

20. The method of claim 19, wherein the second desired point area is determined based on the second sample location distance, the solid angle, and the second angle.

21. The method of claim 20, wherein the second desired point area is determined by multiplying the solid angle by the square of the second sample location distance and dividing by the cosine of the second angle.

22. The method of claim 19, wherein, when the second angle is determined to be within a predetermined value near ninety degrees, the second desired point area is determined by multiplying the solid angle by the square of the second sample location distance.

23. A non-transitory computer-readable storage medium comprising computer-executable instructions for shading a scene using a point in a point cloud, the point representing a sample location on a surface primitive of an object in the scene, the surface primitive lying at least partially within a camera viewing frustum of a virtual camera, the virtual camera having a focal point, the computer-executable instructions comprising instructions for:
    determining a sample location distance, wherein the sample location distance is a near plane distance of the camera viewing frustum or the length of a line between the sample location on the surface primitive and the focal point of the virtual camera;
    obtaining a solid angle of the surface primitive subtended at the focal point of the virtual camera;
    determining a first desired point area of the point in the point cloud based on the sample location distance and the solid angle; and
    shading the scene using the first desired point area of the point in the point cloud.

24. The non-transitory computer-readable storage medium of claim 23, further comprising instructions for:

determining an angle between a surface normal at the sample location and the line between the sample location and the focal point of the virtual camera.

25. The non-transitory computer-readable storage medium of claim 24, wherein the first desired point area is determined by multiplying the solid angle by the square of the sample location distance and dividing by the cosine of the angle between the surface normal at the sample location and the line between the sample location and the focal point of the virtual camera.

26. The non-transitory computer-readable storage medium of claim 24, wherein, when the angle is determined to be within a predetermined value near ninety degrees, the first desired point area is determined by multiplying the solid angle by the square of the sample location distance.

27. The non-transitory computer-readable storage medium of claim 23, wherein the obtained solid angle is a solid angle of a center pixel of a rendered image plane.

28. The non-transitory computer-readable storage medium of claim 23, wherein the instructions for determining the sample location distance further comprises instructions for:
selecting the maximum of either the near plane distance or the length of the line.

29. A computer system for shading a scene using a point in a point cloud, the point representing a sample location on a surface primitive of an object in the scene, the surface primitive lying at least partially within a camera viewing frustum of a virtual camera, the virtual camera having a focal point, the system comprising:
memory configured to store the point in the point cloud; and
one or more processors configured to:
determine a sample location distance, wherein the sample location distance is a near plane distance of the camera viewing frustum or the length of a line between the sample location on the surface primitive and the focal point of the virtual camera;
obtain a solid angle of the surface primitive subtended at the focal point of the virtual camera;
determine a first desired point area of the point in the point cloud based on the sample location distance and the solid angle; and
shade the scene using the first desired point area of the point in the point cloud.

30. A non-transitory computer-readable storage medium comprising computer-executable instructions for shading a scene using a point in a point cloud, the point representing a sample location on a first surface primitive of a first object, the first surface primitive lying at least partially outside a camera viewing frustum of a virtual camera, the virtual camera having a focal point, the computer-executable instructions comprising instructions for:
determining a first sample location distance, wherein the first sample location distance is the length of a first line between a first sample location on the first surface primitive and a closest point on the camera viewing frustum;
obtaining a cut quality criterion solid angle, wherein the cut quality criterion solid angle is used to select a subset of nodes of an octree for shading, and wherein the octree is a data structure corresponding to the point cloud;
determining a first desired point area of the point in the point cloud based on the first sample location distance and the cut quality criterion solid angle; and
shading the scene using the first desired point area of the point in the point cloud.

31. The non-transitory computer-readable storage medium of claim 30, further comprising instructions for:
determining a first angle between a surface normal at the first sample location and the first line.

32. The non-transitory computer-readable storage medium of claim 31, wherein the first desired point area is determined by multiplying the cut quality criterion solid angle by the square of the first sample location distance and dividing by the cosine of the first angle.

33. The non-transitory computer-readable storage medium of claim 31, wherein, when the first angle is determined to be within a predetermined value near ninety degrees, the first desired point area is determined by multiplying the cut quality criterion solid angle by the square of the first sample location distance.

34. A computer system for shading a scene using a point in a point cloud, the point representing a first sample location on a surface primitive of a first object in the scene, the first surface primitive lying at least partially outside a camera viewing frustum of a virtual camera, the virtual camera having a focal point, the system comprising:
memory configured to store the point in the point cloud; and
one or more processors configured to:
determine a first sample location distance, wherein the first sample location distance is the length of a first line between a first sample location on the first surface primitive and a closest point on the camera viewing frustum;
obtain a cut quality criterion solid angle, wherein the cut quality criterion solid angle is used to select a subset of nodes of an octree for shading, and wherein the octree is a data structure corresponding to the point cloud;
determine a first desired point area of the point in the point cloud based on the first sample location distance and the cut quality criterion solid angle; and
shade the scene using the first desired point area of the point in the point cloud.

35. The computer system of claim 34, wherein the one or more processors are further configured to:
determine a first angle between a surface normal at the first sample location and the first line.

36. The computer system of claim 35, wherein the first desired point area is determined by multiplying the cut quality criterion solid angle by the square of the first sample location distance and dividing by the cosine of the first angle.

37. The computer system of claim 35, wherein, when the first angle is determined to be within a predetermined value near ninety degrees, the first desired point area is determined by multiplying the cut quality criterion solid angle by the square of the first sample location distance.

* * * * *